US006878391B2

(12) United States Patent
Veltrop

(10) Patent No.: US 6,878,391 B2
(45) Date of Patent: Apr. 12, 2005

(54) METHOD FOR MAINTAINING COOKED FOOD IN A READY-TO-SERVE CONDITION USING A FREESTANDING COVER FOR FOOD TRAYS

(75) Inventor: Loren J. Veltrop, Deerfield, IL (US)

(73) Assignee: Prince Castle Inc., Carol Stream, IL (US)

(*) Notice: Subject to any disclaimer, the term of this patent is extended or adjusted under 35 U.S.C. 154(b) by 0 days.

(21) Appl. No.: 10/308,347

(22) Filed: Dec. 2, 2002

(65) Prior Publication Data

US 2003/0118706 A1 Jun. 26, 2003

Related U.S. Application Data

(60) Division of application No. 10/083,964, filed on Feb. 27, 2002, now Pat. No. 6,637,322, which is a continuation-in-part of application No. 09/515,166, filed on Feb. 29, 2000, now Pat. No. 6,412,403.

(51) Int. Cl.[7] .................................................. A23L 3/00
(52) U.S. Cl. ....................................... 426/418; 426/520
(58) Field of Search ................................. 426/418, 520; 99/426, 467, 483; 219/385–387, 391–395

(56) References Cited

U.S. PATENT DOCUMENTS

| | | | |
|---|---|---|---|
| 3,751,629 A | 8/1973 | Eisler | 219/201 |
| 3,908,749 A | 9/1975 | Williams | 165/2 |
| 4,005,745 A | 2/1977 | Colato et al. | 165/2 |
| 4,103,736 A | 8/1978 | Colato et al. | 165/48 R |
| 4,110,587 A | 8/1978 | Souder et al. | 219/10.49 R |
| 4,235,282 A | 11/1980 | de Filippis et al. | 165/61 |
| 4,517,446 A | 5/1985 | Torning | 219/386 |
| 4,605,267 A | 8/1986 | Rinkewich | 312/297 |
| 4,835,368 A | 5/1989 | Fortmann et al. | 219/401 |
| 4,891,498 A | 1/1990 | Fortmann et al. | 219/401 |
| 4,939,987 A | 7/1990 | Smith | 99/468 |
| 5,025,132 A | 6/1991 | Fortmann et al. | 219/401 |
| 5,028,761 A | 7/1991 | Oda et al. | 219/386 |
| 5,132,520 A | 7/1992 | Blanton et al. | 219/400 |
| 5,189,281 A | 2/1993 | Wyatt et al. | 219/386 |
| 5,209,941 A | 5/1993 | Wuest | 426/510 |
| 5,285,051 A | 2/1994 | DeGrow et al. | 219/386 |
| 5,365,039 A | 11/1994 | Chaudoir | 219/401 |
| 5,449,232 A | 9/1995 | Westbrooks et al. | 312/410 |
| 5,454,427 A | 10/1995 | Westbrooks et al. | 165/12 |
| 5,520,102 A | 5/1996 | Monetti | 99/483 |
| 5,724,886 A | 3/1998 | Ewald et al. | 99/374 |
| 5,783,803 A | 7/1998 | Robards | 219/392 |
| 5,852,967 A | 12/1998 | Fortmann et al. | 99/483 |
| 5,900,173 A | 5/1999 | Robards | 219/392 |
| 5,947,012 A | 9/1999 | Ewald et al. | 99/374 |
| 6,116,154 A | 9/2000 | Vaseloff | 99/483 |
| 6,175,099 B1 | 1/2001 | Shei et al. | 219/399 |
| 6,262,394 B1 | 7/2001 | Shei et al. | 219/399 |
| 6,637,322 B2 * | 10/2003 | Veltrop | 99/483 |

OTHER PUBLICATIONS

Thermodyne Precision Conduction Cooking System, Model 200–D, Thermodyne Foodservice Products, Inc., Fort Wayne, Indiana (1991).

* cited by examiner

Primary Examiner—Drew Becker
(74) Attorney, Agent, or Firm—McDonnel Boehnen Hulbert & Berghoff LLP

(57) ABSTRACT

A freestanding cover for a food tray has a flange section and a support section extending downwardly from the flange section. The support section supports the cover independently of the tray, with the flange section positioned above the tray opening. The freestanding cover is inserted into a heated compartment in a food warming cabinet and is supported on a retaining mechanism positioned on the shelf of the food warming cabinet. The retaining mechanism, in the form of a wire rack, prevents the cover from moving forward or backward. With the cover retained by the wire rack, a tray containing previously cooked food portions may be inserted into and removed from a receiving space in the cover, leaving the cover inside of the compartment.

14 Claims, 11 Drawing Sheets

METHOD FOR MAINTAINING COOKED FOOD IN A READY-TO-SERVE CONDITION USING A FREESTANDING COVER FOR FOOD TRAYS

This is a divisional of application Ser. No. 10/083,964, filed Feb. 27, 2002, now U.S. Pat. No. 6,637,322, which is a continuation-in-part of application Ser. No. 09/515,166, filed Feb. 29, 2000, now issued as U.S. Pat. No. 6,412,403.

BACKGROUND OF THE INVENTION

1. Field of the Invention

This invention relates to the field of food preparation. More particularly, this invention relates to an apparatus and method for maintaining in a ready-to-serve condition cooked food portions contained in a food tray, wherein a freestanding cover is used to cover the food trays.

2. Description of Related Art

In many establishments, such as fast food restaurants, certain food items are cooked well in advance of when they are ordered by or served to the customer. Examples of such food items can include sandwich fillings, such as cooked eggs, hamburger patties, breaded foods, such as chicken nuggets, or baked goods, such as muffins. These previously cooked food items are often maintained in a ready-to-use or ready-to-serve condition until they are served to the customer. This typically involves maintaining the previously cooked food items at a serving temperature in the range of from about 145° F. to about 200° F., depending on the food item.

Various food warming apparatus have been developed to maintain previously cooked food items at a desired serving temperature. Such food warming apparatus are sometimes referred to as staging cabinets, holding cabinets, or warming cabinets. One of the challenges associated with food warming apparatus is being able to preserve the flavor, appearance, and texture of the previously cooked food items while they are being maintained at the desired serving temperature. In particular, certain types of food items, such as cooked eggs and hamburger patties have a tendency to dry out undesirably then they are kept warm for extended periods of time. Other types of food items, such as fried foods, have a tendency to become undesirably soggy when they are kept warm for extended periods of time.

One commonly used way to protect previously cooked food items for which drying out is a concern, is to place the food items in a container, such as a tray, and to provide a cover for the container. The cover restricts evaporation of moisture from the previously cooked food items. With a reduced amount of moisture vapor being able to escape from the covered container, the previously cooked food items contained therein do not dry out as rapidly.

Conventional covers are inconvenient to use in food fast restaurants and similar establishments. This is because when previously cooked food portions are taken from the food warming apparatus, the cover typically must be removed from the tray to gain access to the food items contained therein, and must be replaced to protect the remaining food portions contained in the tray. The steps of removing and replacing a cover can take an amount of time that is unacceptably large in fast food restaurants. The removed cover can become misplaced or contaminated and can get in the way of other activities in the kitchen area.

Food warming apparatus that do not require a separate cover the food trays have also been developed. For example, U.S. Pat. Nos. 5,783,803 and 5,900,173 to Robards disclose a food warming apparatus in which a grate supports the food trays in a warming cavity. A seal is operatively associated between the top of the tray and the ceiling of the cavity. The grate includes a biasing portion that biases the tray upwardly so that it seals against the ceiling. The advantage of providing a seal in this manner is that evaporation of liquid from previously cooked food portions contained in the trays is greatly reduced. A disadvantage with this approach, however, is that the components required to provide the seal can be costly, complex, or difficult to clean.

A modification of this approach has been used in which the grate biases the food tray towards the ceiling of the warming cavity such that the lip of the tray touches, or nearly touches, the ceiling without necessarily forming a seal. It has been that evaporation is sufficiently restricted in this configuration, even though no seal is formed.

Another approach is disclosed in U.S. Pat. Nos. 5,724,886 and 5,947,012 to Ewald, et al. These patents disclose a food staging device having a plurality of compartments, with each compartment bounded by an upper heated compartment surface and a lower heated compartment surface. The trays containing previously cooked food portions are sized such that the top edges are within zero to 0.25 inches from the upper heated compartment surface. This zero to 0.25 inch distance is said to be sufficient to restrict evaporation of liquid form the food portions contained in the trays.

A disadvantage with the approach disclosed in these patents is that once the distance between the upper and lower compartment surfaces is set, a tray within a particular size range must be provided in order for its top edge to be within zero to 0.25 inches from the upper compartment surface. Another disadvantage with this approach is that for previously cooked food items for which sogginess is a concern, air circulation should be encouraged, rather than restricted. Accordingly, these patents disclose that different trays may be used, depending on whether the previously cooked food portions tend to dry out or tend to become soggy.

Moreover, a disadvantage with the general approach of bringing the food tray close to the heated cavity ceiling or heated upper compartment surface is that the heated surface transmits heat radiatively into the food tray. This radiant heat can affect the flavor, appearance, and texture of food items located near the top of the tray, even though evaporation from the tray is restricted.

U.S. Pat. No. 5,852,967 to Fortmann, et al., discloses yet another a food warming apparatus comprising a frame having first and second walls. At least one of the first and second walls is movable relative to the other in order to vary the spacing between them. Trays containing previously cooked food items are placed between the first and second walls, so that the first wall bears the tray, and the second wall at least partially blocks the open top of the tray. A disadvantage with this approach, however, is that the moving parts required to provide the movable wall can be difficult to maintain. Another disadvantage with the approach is that it does not easily allow trays of different sizes to be placed in the same compartment.

Accordingly, what is needed is a food warming apparatus that has the flexibility to be able to maintain in a ready to use condition both cooked food items that tend to dry out and cooked food items that tend to become soggy, and to use trays of various sizes, as may be needed to meet the rapidly changing demands that can occur in fast food restaurants or similar establishments. The food warming apparatus should also be inexpensive to construct, and easy to use and to maintain.

SUMMARY OF THE INVENTION

In a first principal aspect, the present invention provides a freestanding cover for a tray, which has a tray lip defining a tray opening. The freestanding cover comprises a flange section, a support section, and a retainer section. The support section is able to support the cover on a shelf independently of the tray. The flange section is generally positioned above the support section, and is also above the tray opening when the cover is placed over the tray. The retainer section is able to engage the shelf, such as when the cover is used in a food warming cabinet.

In a second principal aspect, the present invention provides a covered tray for holding previously cooked food portions in a ready to use condition. The covered tray comprises a tray and a freestanding cover. The tray has tray sidewalls and a tray lip defining a tray opening. The tray is able to contain the previously cooked food portions. The freestanding cover has a flange section and a support section. The support section supports the cover independently of the tray, such that at least a part of the flange section is positioned above the tray opening.

In a third principal aspect, the present invention provides a food warming apparatus for maintaining previously cooked food portions in a ready to use condition. The food warming apparatus comprises a cabinet, having a heated compartment therein and at least an open front side providing access to the heated compartment. In particularly preferred forms, the cabinet may have open front and open back sides providing access to the heated compartment. The heated compartment has an upper compartment surface and a lower compartment surface. A covered tray is disposed in the heated compartment. The covered tray comprises a tray and a freestanding cover. The tray, which has a tray lip defining a tray opening, is able to hold the previously cooked food portions. The freestanding cover has a flange section and a support section. The support section supports the cover independently of the tray, such that at least a portion of the flange section is positioned above the tray opening.

In a fourth principal aspect, the present invention provides a method for maintaining previously cooked food portions in a ready to use condition in a food warming apparatus. The food warming apparatus comprises a cabinet having a heated compartment that has an upper compartment surface and a lower compartment surface. The previously cooked food portions are placed in a tray having a tray lip defining a tray opening. The tray is inserted into a receiving space defined by a freestanding cover disposed in the heated compartment. The cover has a flange section and a support section extending downwardly from the flange section. The support section substantially defines the receiving a space, and at least a portion of the flange section is positioned above the receiving space.

In a fifth principal aspect, the present invention provides a freestanding cover for a tray, which has a tray lip defining a tray opening. The freestanding cover comprises a flange section and a support section. The support section is able to support the cover on a shelf independently of the tray. The flange section is generally positioned above the support section, and is also above the tray opening when the cover is placed over the tray. The support section cooperates with a retaining mechanism positioned on the shelf of a food warming apparatus that cooperates with the cover to retain the cover within the food warming apparatus independently of the tray.

DETAILED DESCRIPTION OF THE PREFERRED EMBODIMENTS

Figure 1:
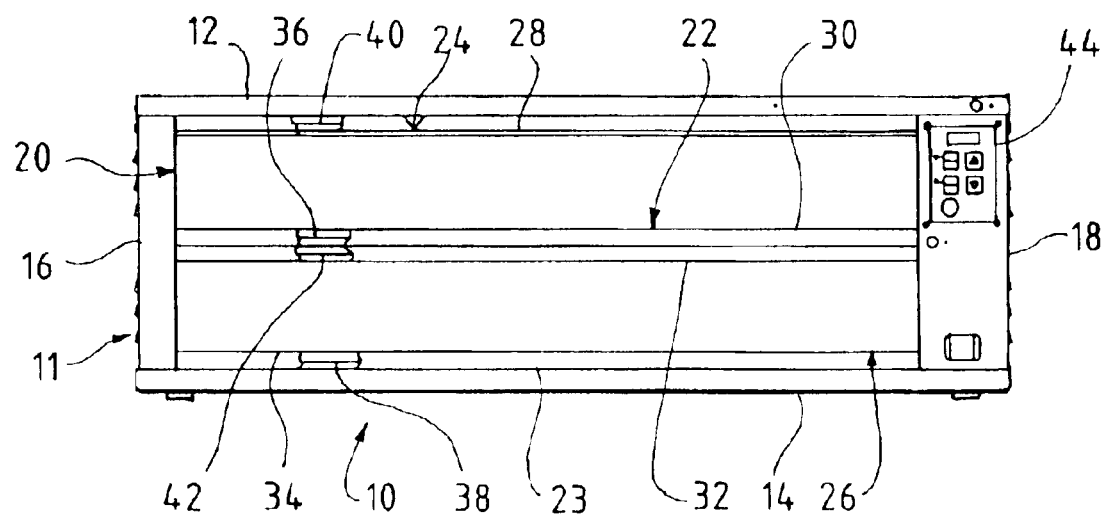
FIG. 1 is a partially cut away front plan view of a food warming cabinet, in accordance with a preferred embodiment of the present invention.
Figure 4:
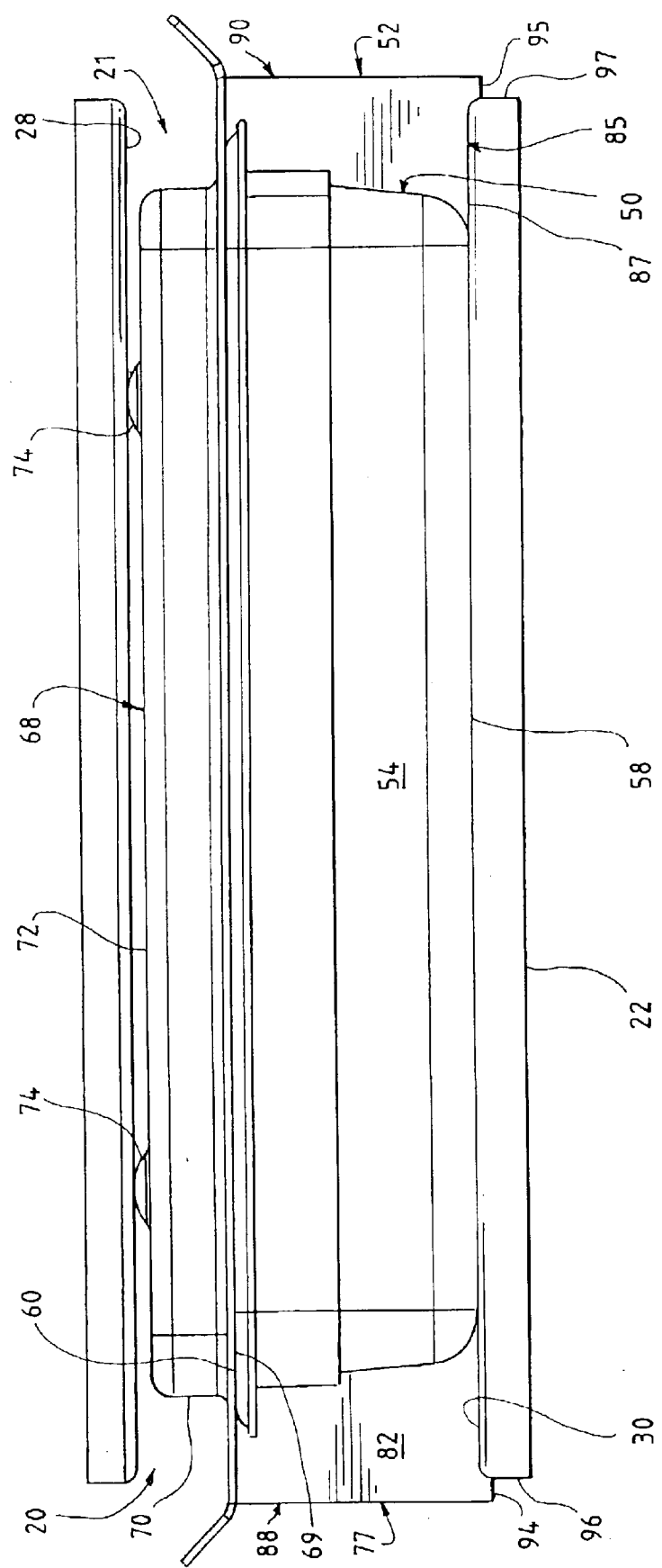
FIG. 4 is a side plan view of the compartment of the food warming cabinet of FIG. 1, with the tray and freestanding cover of FIG. 2 shown therein, but with the right sidewall of the freestanding cover cut away, in accordance with a preferred embodiment of the present invention.
Figure 5:
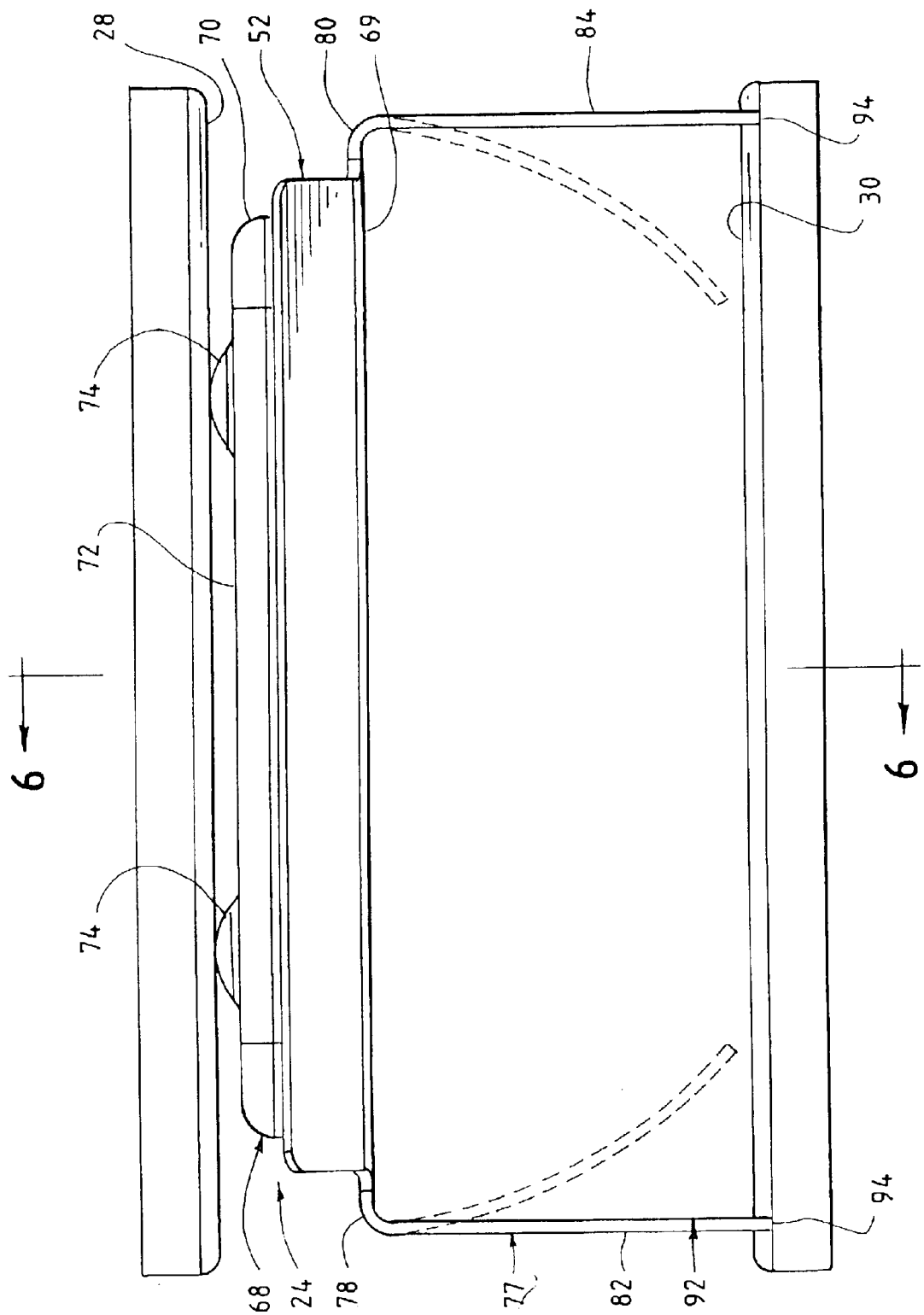
FIG. 5 is a front plan view of the compartment of the food warming cabinet of FIG. 1, with the freestanding cover of FIG. 2 shown therein, in accordance with a preferred embodiment of the present invention.

With reference to FIG. 1, a food warming cabinet 10 has a housing 11. Housing 11 has a top wall 12, a bottom wall 14, a left side wall 16, a right side wall 18, and an open front side 20. Preferably, housing 11 also has an open rear side 21, as shown in FIGS. 4 and 5. However, the rear side of housing 11 may also be closed.

A middle shelf 22 and a bottom shelf 23 are mounted in cabinet 10. Middle shelf 22 divides the space within cabinet 10 so as to define a first compartment 24 above it and a second compartment 26 below it. Although cabinet 10 is shown in FIG. 1 with two compartments for illustration, cabinet 10 can include a greater or fewer number of compartments. Shelves 22 and 23 are able to support one or more previously cooked food items or containers filled with previously cooked food items.

Preferably, shelves 22 and 23 are substantially imperforate, have substantially smooth and horizontal surfaces thereon, and extend from the left side to the right side of each compartment. However, as used herein, the term "shelf" encompasses other structures that are able to support objects, such as containers or food items, inside of a compartment. Thus, shelves 22 and 23 may have openings defined therethrough, may have non-uniform or non-horizontal surfaces thereon, and may have surfaces of varying height thereon. Shelves 22 and 23 may also include various support structures, such as spacers, risers, rails, or grates that support one or more food items or one or more food containers. Finally, shelves 22 and 23 may be mounted on only one side of cabinet 10 so as to extend into only part of the compartments.

First compartment 24 has a first upper compartment surface 28 and a first lower compartment surface 30. Lower compartment surface 30 is defined by one surface of shelf 22. Second compartment 26 has a second upper compartment surface 32 and a second lower compartment surface 34. Second upper compartment surface 32 is defined by a second surface of shelf 22, and second lower compartment surface 34 is defined by one surface of shelf 23. Preferably, compartment surfaces 28, 30, 32, and 34 are substantially uniform and horizontal. However, surfaces 28–34 may be non-uniform and may include non-horizontal sections. Accordingly, different sections of surfaces 28-34 may be positioned at different heights in cabinet 10.

One or more heaters are mounted in cabinet 10 for heating first compartment 24 and second compartment 26. Preferably, a first heater 36 is mounted within shelf 22 to heat first lower compartment surface 30, and a second heater 38 is mounted within shelf 23 to heat second lower compartment surface 34. Most preferably, a third heater 40 is also mounted in cabinet 10 to heat first upper compartment surface 28, and a fourth heater 42 is mounted within shelf 22 to heat second upper compartment surface 32. Heaters 36–42 are preferably electrical resistance heaters. Surfaces 28–34 are preferably adjacent to heaters 36–42, respectively, and are preferably made out of a high thermal conductivity material, such as aluminum for efficient and uniform heating.

In this way, first upper compartment surface 28 and first lower compartment surface 30 effectively heat first compartment 24; and second upper compartment surface 32 and second lower compartment surface 34 effectively heat second compartment 26. Preferably, heaters 36–42 can be separately controlled, to allow compartments 24 and 26 to operate at different temperatures and to allow the upper and lower surfaces of each compartment to operate at different temperatures. Food warming cabinet 10 is provided with a control panel 44 to allow the user to control the temperatures set by heaters 32–42.

First compartment 24 and second compartment 26 are heated in order to maintain a proper temperature of any previously cooked portions until they are ready for use. The previously cooked food portions are placed in trays that may be inserted into and removed from compartments 24 and 26. Compartments 24 and 26 may accommodate more than one tray at a time, depending on the size of the trays.

Trays that hold food items for which drying out is a concern would be used with an individual freestanding cover, as described below, in order to limit evaporation from the food items therein while being stored in food warming cabinet 10. However, covers would not be used with trays that hold food items having a tendency to become soggy.

FIGS. 2–6 show how a representative tray 50 and freestanding cover 52 would be placed in first compartment 24. The placement of tray 50 and cover 52 in second compartment 26 would be similar.

Figure 2:
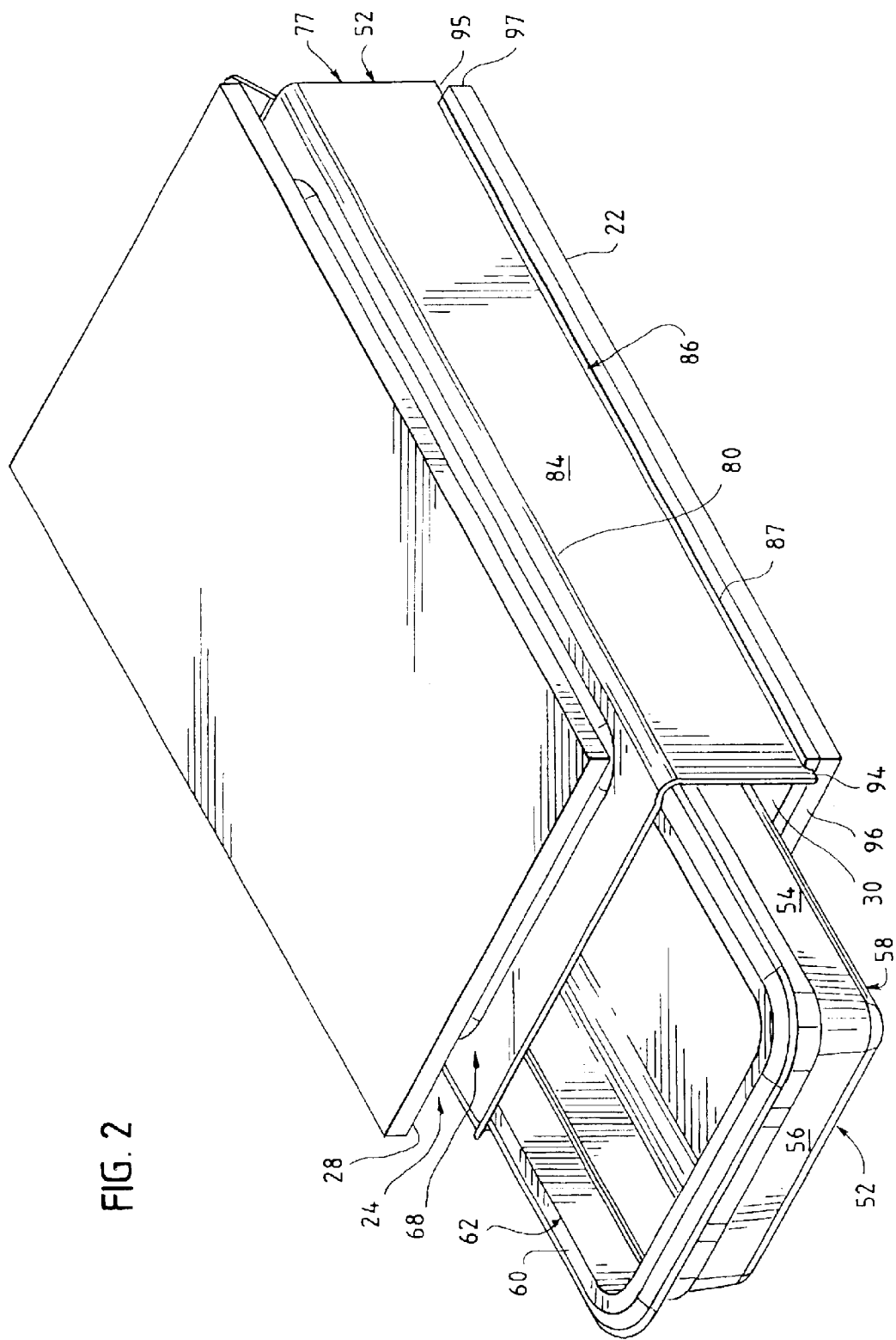
FIG. 2 is a perspective view of a tray being inserted into a compartment of the food warming cabinet of FIG. 1, with a freestanding cover therein, in accordance with a preferred embodiment of the present invention.
Figure 3:
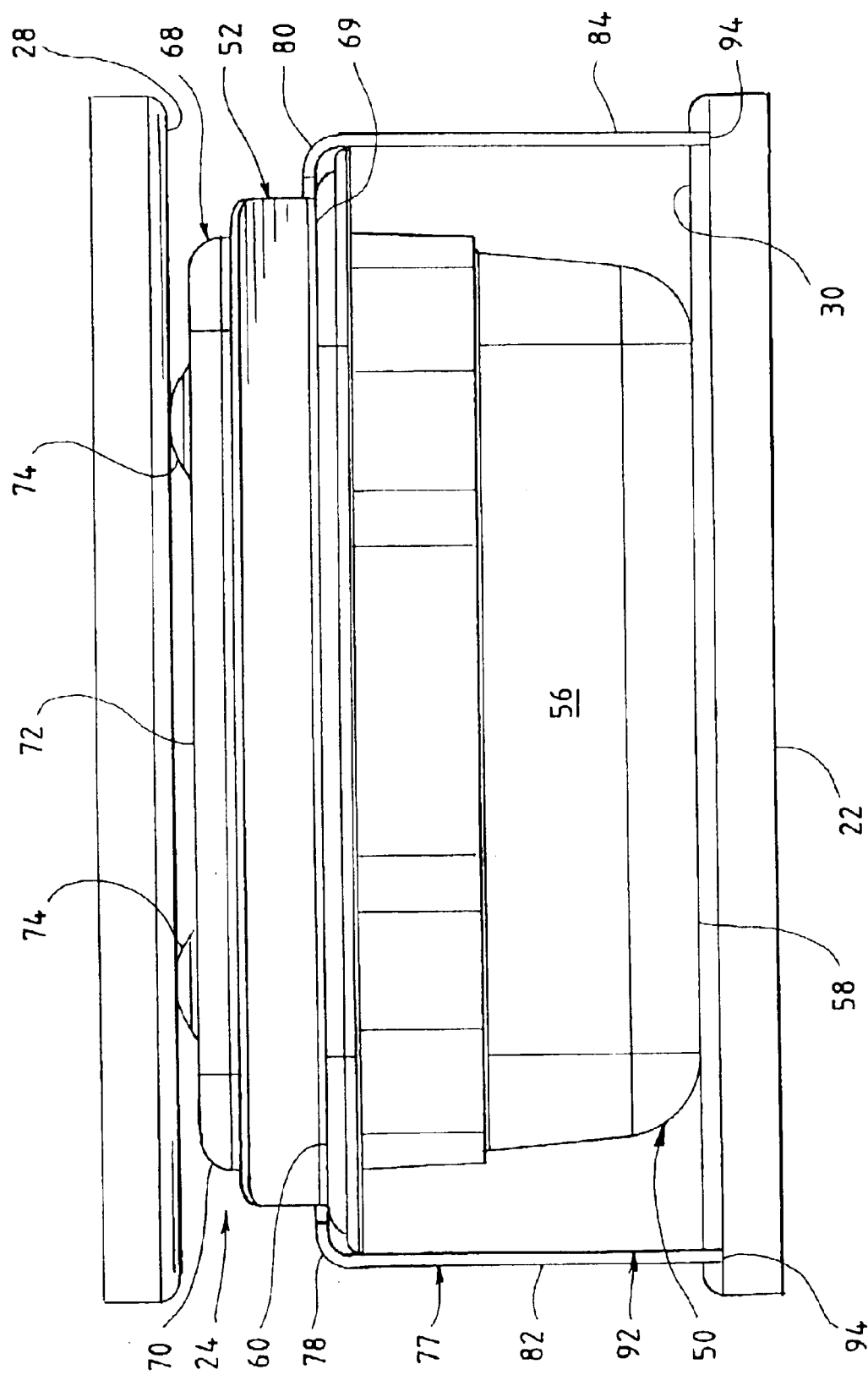
FIG. 3 is a front plan view of the compartment of the food warming cabinet of FIG. 1, with the tray and freestanding cover of FIG. 2 shown therein, in accordance with a preferred embodiment of the present invention.

With reference to FIGS. 2, 3, and 4, tray 50 includes a pair of opposing long sidewalls 54 and a pair of opposing short sidewalls 56. Sidewalls 54 and 56 extend upwardly from a bottom wall 58 to a lip 60 that encircles a tray opening 62. Tray may also be provided with a handle in front, in back, or in both front and back.

As best shown in FIGS. 3–6, freestanding cover 52 has a flange section 68 that includes a flange surface 69 encircling a raised section 70. Raised section 70 has a top wall 72 and defines a semi-enclosed upper space 73 above flange surface 69. A plurality of protrusions 74 extend upwardly from top wall 72.

Although flange section 68 preferably has upper space 73 defined therein, flange section 68 may be differently configured. For example, flange section 68 may simply be a substantially flat surface. In general, however, flange section will be substantially imperforate and sized so as to at least partially block tray opening 62.

Cover 52 also has a support section 77 that supports flange section 68. Support section 77 preferably includes a left bent section 78 connected to the left side of flange section 68, a right bent section 80 connected to the right side of flange section 68, a left sidewall 82 extending downwardly from left bent section 78, and a right sidewall 84 extending downwardly from right bent section 80. Other configurations for support section 77 are possible. For example, support section 77 may be provided as four legs (not shown). Sidewalls 82 and 84 extend downwardly to terminating edges 85 and 86, respectively. Portions of terminating edges and 85 and 86 define a supporting edge 87. Supporting edge 87 is able to support cover 52 on shelf 22. In this way, cover 52 is freestanding, in that it is able to stand on its own on shelf 22, supported by supporting edge 87. More particularly, freestanding cover 52 need not be supported on a tray, such as tray 50.

Cover 52 has a front opening 88 and may also have a rear opening 90. Sidewalls 82 and 84 define a receiving space 92 therebetween, such that receiving space 92 extends from front opening 88 to rear opening 90. Receiving space 90 is sized to accommodate tray 52, and openings 88 and 90 are sized to allow tray 52 to be inserted into and removed from receiving space 92.

Cover 52 also has a retainer section for selectively engaging shelf 22. In a preferred embodiment, cover 52 has a pair of front retaining tabs 94 and a pair of rear retaining tabs 95 extending below the level of supporting edge 87. Retaining tabs 94 and 95 are preferably integral to sidewalls 82 and 84. To engage shelf 22, front retaining tabs 94 are positioned in front of a front edge 96 of shelf 22, and rear retaining tabs 94 are positioned behind a rear edge 97 of shelf 22. In this way, front retaining tabs 94 engage front edge 96 to prevent cover 52 from moving backwards, and rear retaining tabs 95 engage rear edge 97 to prevent cover from moving forward. Although the retainer section of cover 52 is preferably provided as retaining tabs 94 and 96, other structures could also be used to engage shelf 22, depending on the structure of shelf 22.

Cover 52 is preferably made out of a plastic sheet material that is rigid enough for cover 52 to be self-supporting but flexible enough that parts of cover 52 can be flexed by the user, as described below. Preferably, the plastic sheet is an acrylonitrile butadiene styrene (ABS) material, with a thickness of about 1/16 of an inch.

Figure 6:
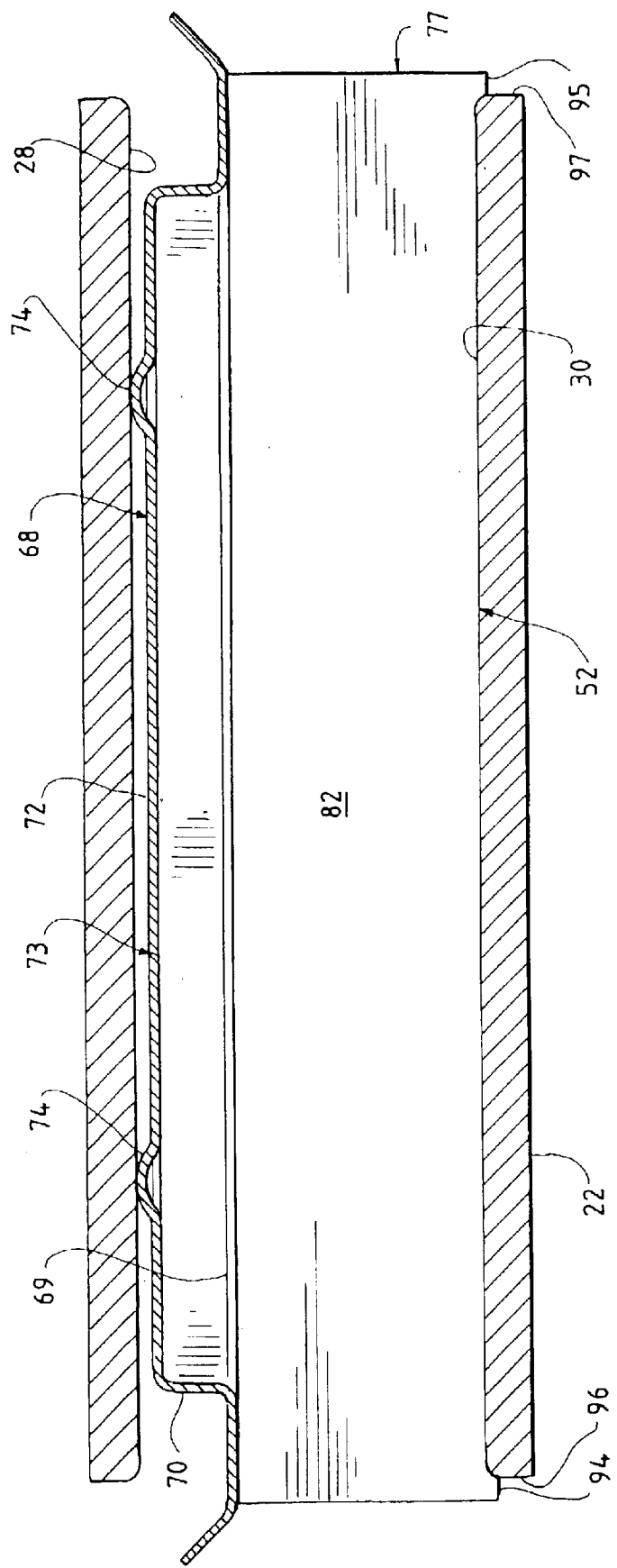
FIG. 6 is a cross-sectional view of the freestanding cover inside of the compartment, taken along line A—A, as shown in FIG. 5, in accordance with a preferred embodiment of the present invention.

If tray 50 contains food portions for which drying out is a concern, then tray 50 is used with cover 52. Normally, cover 52 is placed inside compartment 24 before tray 50 is inserted into the food warming apparatus, as best shown in FIGS. 5 and 6. With cover 52 inside of compartment 24, supporting edge 87 rests upon lower compartment surface 30, and protrusions 74 contact upper compartment surface 28. In this way, cover 52 is unable to move upwardly or downwardly within compartment 24. Additionally, as best shown in FIGS. 2 and 6, front retaining tabs 94 engage front edge 96 of shelf 22 and rear retaining tabs 95 engage rear edge 97 of shelf 22 to prevent cover 52 from moving forward or backward within compartment 24.

However, cover 52 is sufficiently flexible to allow retaining tabs 94 and 95 to be disengaged from shelf 22. For example, sidewalls 84 and 86 may be flexed inwardly, as shown by the dashed lines in FIG. 5, so that front retaining tabs 88 clear lower compartment surface 30. Rear retaining tabs 95 may be disengaged from shelf 22 by similar flexing of sidewalls 84 and 86. Alternatively, sidewalls 84 and 86 may be flexed outwardly, or tabs 94 and 95 may be bent either inwardly or outwardly to disengage tabs 94 and 95. With either front tabs 94 or rear tabs 95 disengaged from shelf 22, cover 52 can be removed from compartment 24. Tabs 94 or 95 are similarly positioned to clear lower compartment surface 30 in order to insert cover 52 into compartment 24.

With cover 52 in place in compartment 24, tray 50, with previously cooked food items contained therein, may be inserted through front opening 88 of cover 52 to be received into receiving space 92, as shown in FIG. 2. As tray 50 is inserted into compartment 24, its bottom wall 58 is supported by lower compartment surface 30, and tray lip 60 slides under flange section 68 of cover 52. Preferably, the distance between supporting edge 87 and flange surface 69 of cover 52 is substantially the same as the distance between the underside of bottom wall 58 and the uppermost surface of lip 60 of tray 50. Thus, flange surface 69 of cover 52 is preferably substantially flush with lip 60 of tray 50 when tray 50 is slid under cover 52. Front retaining tabs 94 prevent cover 52 from being pushed backward while tray 50 is being inserted into compartment 24.

Although FIG. 2 shows tray 50 being inserted into compartment 24 from the front, if compartment 24 is open in the back, as is preferred, then tray 50 may also be inserted into compartment 24 from the back. Tray 52 would simply be inserted into receiving space 92 through rear opening 90. In the case that compartment 24 is open in both the front and the back, cover 52 preferably includes means to locate tray 50 with respect to the front and back of compartment 24, i.e., to prevent tray 50 from being inserted too far into compartment 24. For example, cover 52 may be provided with flexible tabs or protrusions (not shown) that engage tray 50 while it is being inserted from either the front or the back, but which cease engagement when tray 50 is in the fully inserted position. In this way, the user inserting tray 50 into compartment 24 can feel when tray 50 is properly positioned within compartment 24.

FIG. 3 is a front view of tray 50 fully inserted into compartment 24 with cover 52 in place. In this position, bottom wall 58 of tray 50 rests upon lower compartment surface 30, and the upper surface of tray 50, which is maximally defined by lip 60, is preferably about one inch from upper compartment surface 28 and about ¾ of an inch from the underside of top wall 72. Moreover, support section 77 of cover 52 positions flange section 68 with respect to tray 50 such that flange surface 69 is substantially flush with lip 60. In this way, tray 50 and cover 52 together define an enclosed space that contains the previously cooked food items. With the food items in this enclosed space, air circulation is prevented and the food items can be kept longer in food warming cabinet 10 without drying out.

Alternatively, instead of flange surface 69 being substantially flush with tray lip 60, evaporation from tray 50 may be sufficiently restricted simply by having flange section block at least a portion of tray opening 62.

Cover 52 also reduces the amount of heat radiation from heated upper compartment surface 28 reaching the previously cooked food items in tray 50. The reduction of radiant heat reaching these previously cooked food items further preserves the maintenance of their flavor, color, and texture during storing in food warming cabinet 10.

After tray 50 has been inserted into compartment 24, it can be pulled out through the open front of compartment 24. If compartment 24 is also open in the back, as shown in FIG. 4, then tray 50 may also be removed from the back of compartment 24. Retaining tabs 94 and 95 prevent cover 52 from being pulled out of compartment 24 when tray 50 is removed from open front side 20 or open rear side 21 of housing 11. As a result, when tray 50 is removed, cover 52 remains within compartment 24. However, cover 52 may also be easily removed from compartment 24 by disengaging either front retaining tabs 94 or rear retaining tabs 95 from shelf 22, as described above.

In the case that tray 50 contains previously cooked food portions that tend to become soggy, then cover 52 need not be used. With cover 52 omitted, tray opening 62 is unblocked when tray 50 is within compartment 24. Preferably, the upper surface of lip 60 is positioned about one inch below upper compartment surface 28. In this configuration, moisture from the previously cooked food items in tray 50 can easily escape, with the result that the food items can be kept in the food warming apparatus for extended periods of time without becoming soggy.

Figure 7:
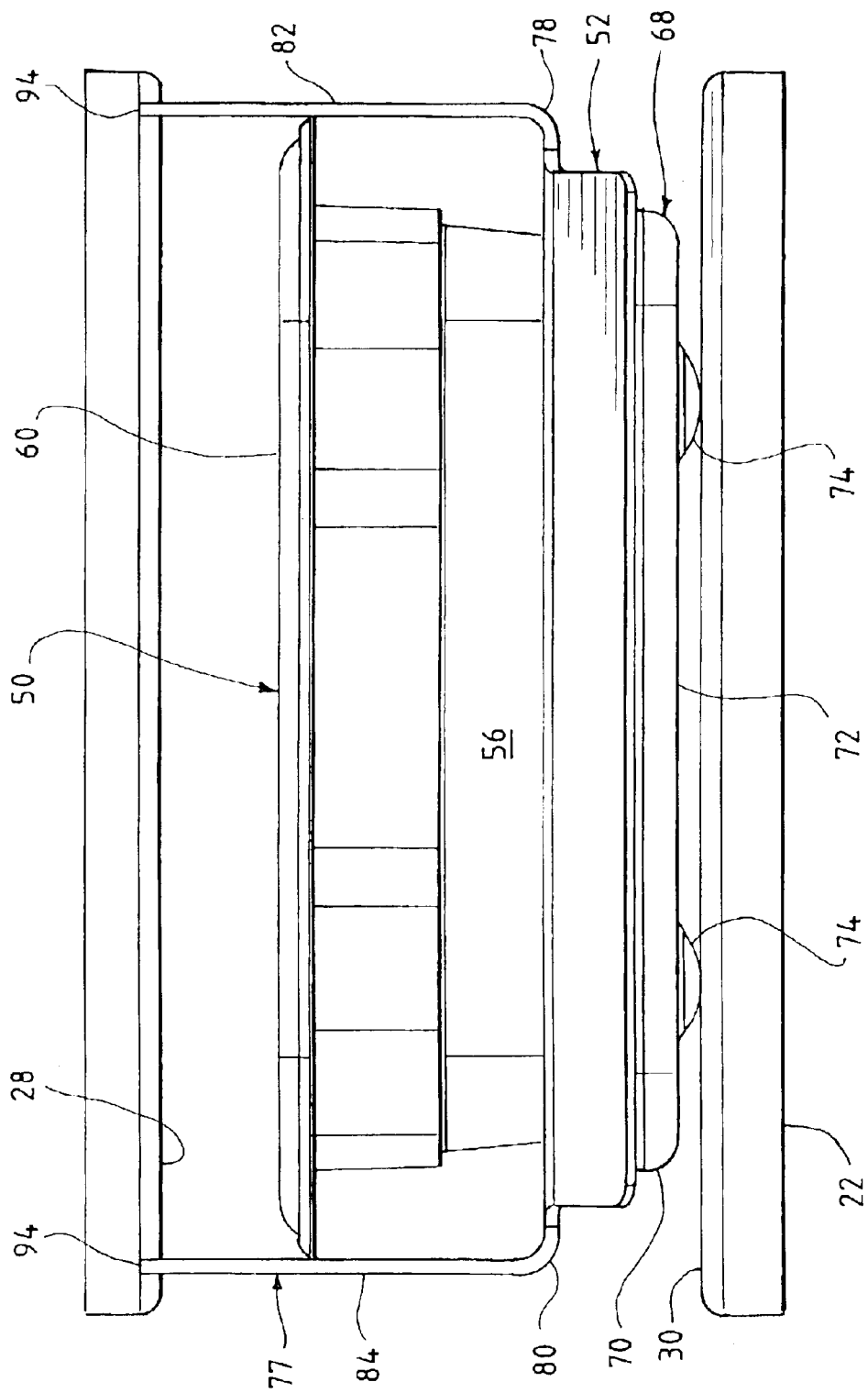
FIG. 7 is a front plan view of the compartment of the food warming cabinet of FIG. 1, with the tray and freestanding cover of FIG. 2 shown therein, but with the freestanding cover in an inverted orientation, in accordance with a preferred embodiment of the present invention.
Figure 8:
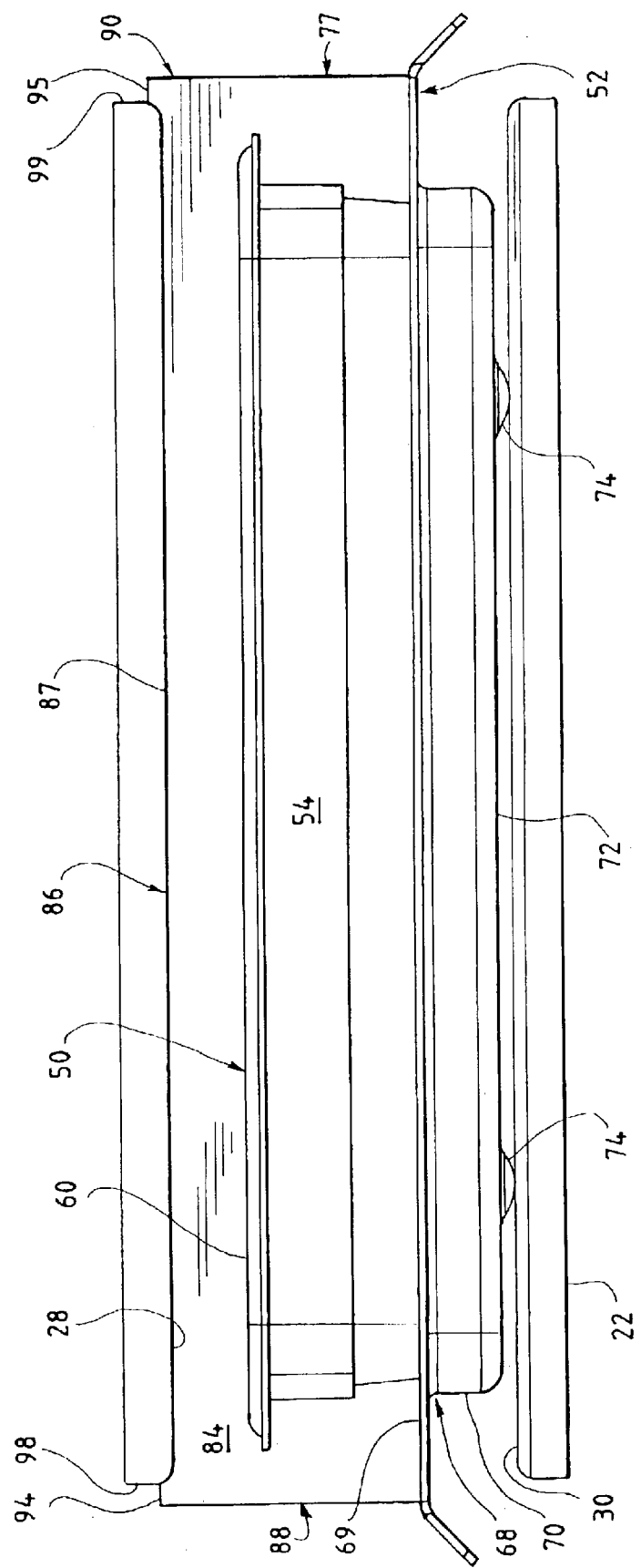
FIG. 8 is a side plan view of the freestanding cover inside of the compartment, as shown in FIG. 7, but with the left sidewall of the freestanding cover cut away, in accordance with a preferred embodiment of the present invention.

Alternatively, cover 52 may be used as shown in FIGS. 7 and 8 to better position tray 50 in compartment 24 when tray contains food items for which sogginess is a concern. In particular, cover 52 is placed in compartment 24 in an inverted orientation, with protrusions 74 supporting cover 52 on lower compartment surface 30 and supporting edge 87 contacting upper compartment surface 28. Front retaining tabs 94 engage a front edge 98 of upper compartment surface 28 to prevent cover 52 from moving backward in compartment 24, and rear retaining tabs 95 engage a rear edge 99 of upper compartment surface 28 to prevent cover 52 from moving forwards in compartment 24. In this inverted orientation, cover 52 is able to receive tray 50 within upper space 73 so that bottom wall 58 of tray 50 is supported on top wall 72 of cover 52. Tray lip 62 is then far enough away from upper surface 28 that moisture can easily escape from within tray 50.

Supporting tray 50 in this manner provides two important advantages. First, because tray 50 is located within upper space 73, it is less likely to slip out of compartment 24 than if it is resting on lower compartment surface 30. Second, with cover 52 positioned in compartment 24 in the inverted orientation, the user inserts tray 50 into receiving space 92 by first sliding bottom wall 58 along flange surface 69. However, as tray 50 becomes fully inserted into compartment 24, bottom wall 58 will no longer be supported by flange surface 69, and tray 52 will tend to lower itself into upper space 73. Thus, a user inserting tray 50 into compartment 24 will be able to tell when tray 50 is fully inserted in compartment 24.

In this way, food warming cabinet 10 is able to maintain previously cooked food portions in a ready-to-use or ready-to-serve condition, whether the cooked food portions tend to dry out or tend to become soggy. Tray 50 is simply used with or without cover 52, or with cover 52 in a regular or an inverted orientation, depending on the type of food items contained therein. Thus, a fast food restaurant is able to use the same type of tray for both types of previously cooked food items. On the other hand, trays of different sizes may also be used within food warming cabinet 10. The differently sized trays would simply be provided with differently sized covers.

Figure 9:
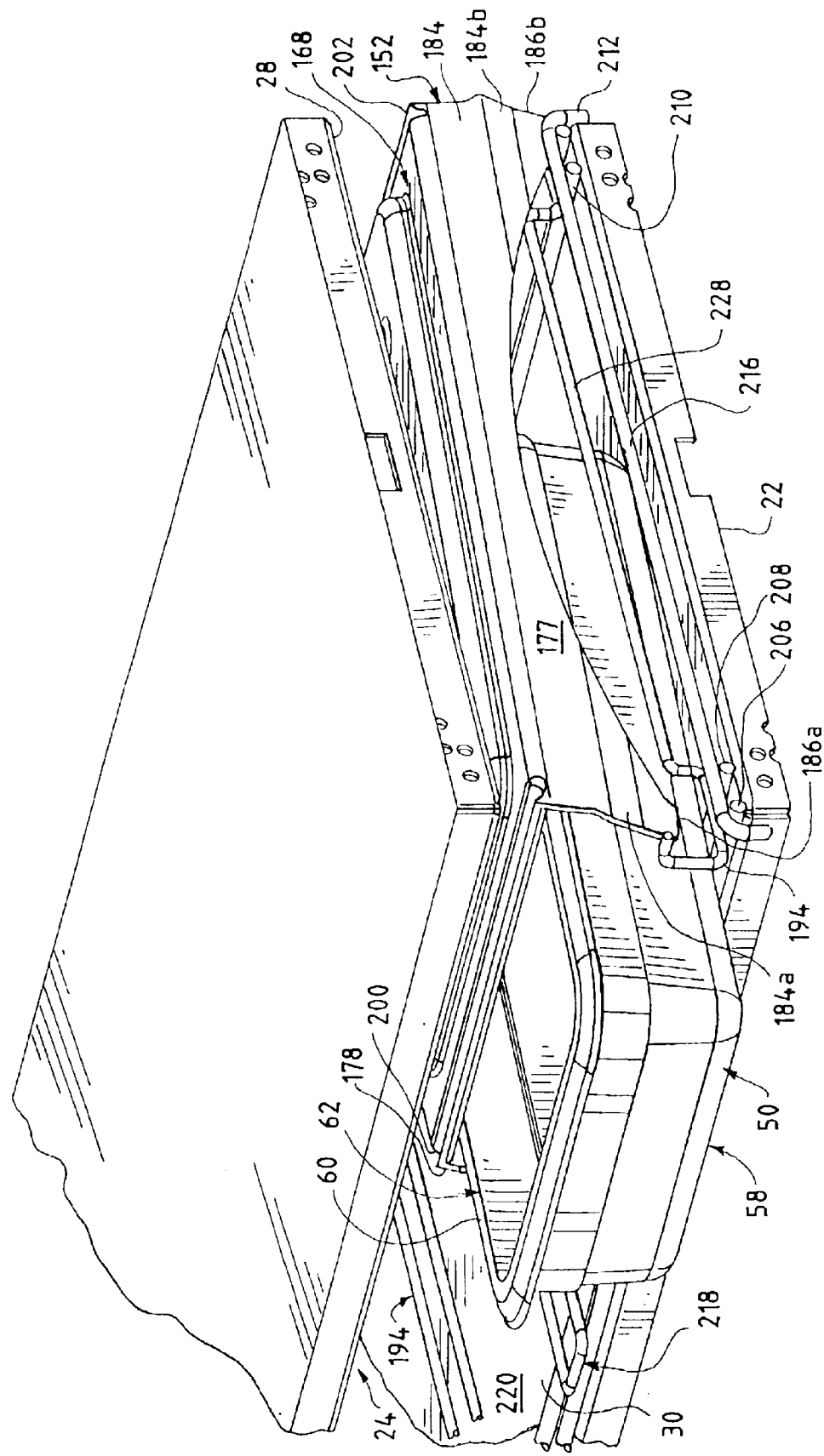
FIG. 9 is a perspective view of a tray being inserted into a compartment of the food warming cabinet of FIG. 1, with a freestanding cover therein, in accordance with an alternate embodiment of the present invention.
Figure 10:
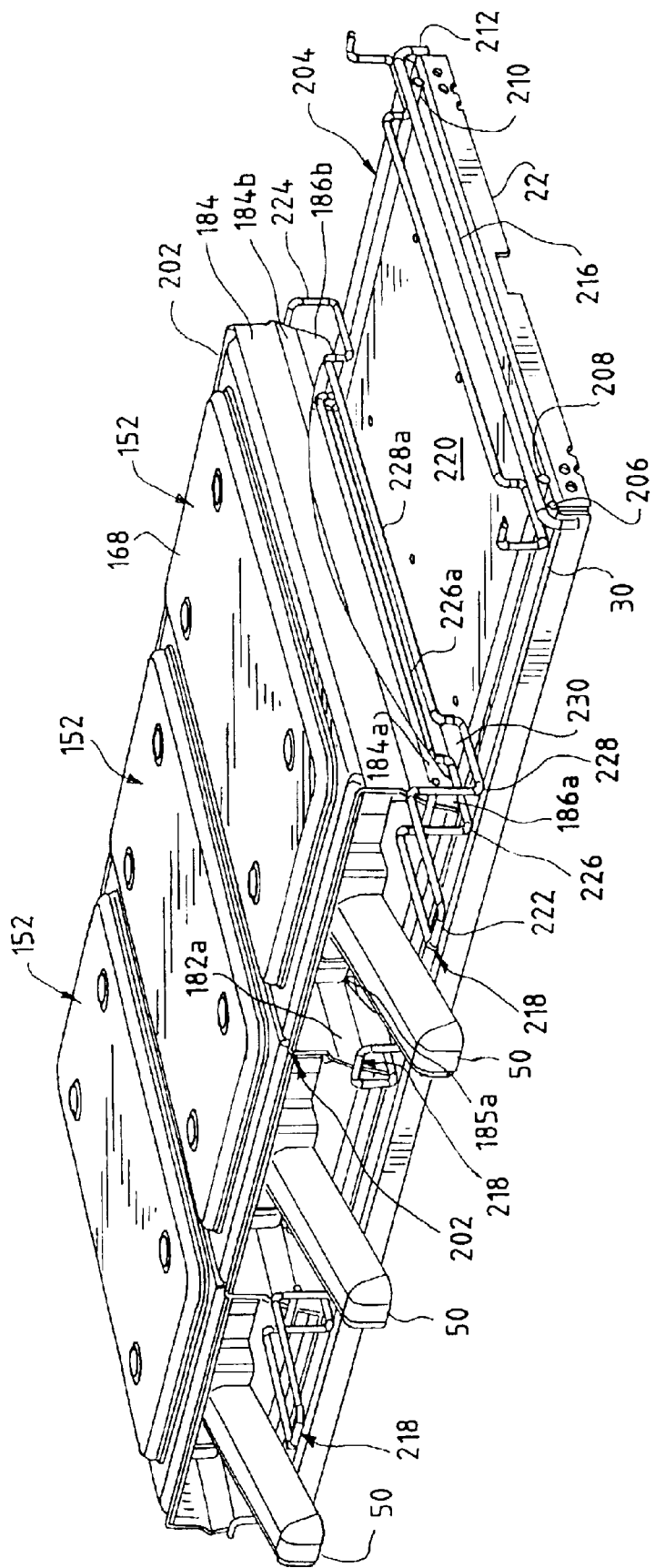
FIG. 10 is a perspective view of the embodiment of FIG. 9, with the upper compartment surface cut away and the trays placed within the cavities defined by the wire rack.

As depicted in FIGS. 9 and 10, an alternate embodiment of the cover 152 includes a flange section 168 and a support section 177. The support section 177 preferably includes a left bent section 178 connected to the left side of flange section 168 and a right bent section 180 connected to the right side of flange section 168. First and second left support legs 182a, 182b extend from the left bent section 178 while first and second right support legs 184a, 184b extend from the right bent section 180. The support legs 182a, 182b and 184a, 184b extend downwardly to terminal edges 185a, 185b and 186a, 186b, respectively. The terminal edges function to support the cover 152 on a retaining mechanism, which will be discussed in detail below.

As can be seen in FIGS. 9 and 10, the flange section 168 includes a lip or ridge 200 adjacent the front opening 88 and a lip or ridge 202 adjacent the rear opening 90. The front lip 200 and the rear lip 202 cooperate with the tray opening 62 of the tray 152 to define an enclosed space that contains the previously cooked items. Besides the presence of the support legs and the front and rear lips, the remaining features of cover 152 are identical to those of cover 52.

The cover 152 is preferably injection molded using polyethylcell foam. However, other equivalent materials may be used in injection molding the cover. Due to the support legs of cover 152, less material is used during its manufacture, as compared to the manufacture of cover 52.

As can be best seen in FIG. 10, a retaining mechanism is positioned on shelf 22. In a preferred embodiment, the retaining mechanism comprises a wire rack 194. The rack 194 includes a rectangular frame 204 having two front frame members 206, 208, two rear frame members 210, 212, and two side frame members 214, 216 extending therebetween. The rack 194 further includes a plurality of channel members 218 spaced equally along the frame 204 from one another and extending transversely from the front of the frame to the rear of the frame. The channel members 218 of the rack 194 define cavities 220 in the wire rack 194 in which trays may be accommodated.

Each channel member 218 includes a front edge 222, a rear edge 224, and two side members 226, 228 extending therebetween, thereby defining a channel 230 in which the support legs of the cover 152 may be accommodated. Each side member 226, 228 includes a raised section 226a, 228a along its mid-section. These raised sections assist in the insertion of the trays 50 into the cavities 220 as well as prevent undesired movement of the covers on the wire rack. Although the wire rack 194 is constructed of steel, other equivalent materials may also be utilized.

In use, the wire rack 194 is positioned on the shelf 22 of the food warming apparatus. The cover 152 is then placed on the wire rack 194. Specifically, the terminal edges 185a, 185b and 186a, 186b are placed within channels 230 and supported by the front frame members 206, 208 and the rear frame members 210, 212, respectively. In this way, cover 152 is freestanding and need not be supported on a tray, such as tray 50.

With cover 152 in place in compartment 24, tray 50, with previously cooked food items contained therein, may be inserted through front opening 88 of cover 152 to be received into receiving space 92, as shown in FIG. 9. As tray 50 is inserted into compartment 24, the bottom wall 58 of the tray 50 slides over the front frame members 206, 208. Once the bottom wall 58 is slid past the front frame members 206, 208, the support legs 182a, 182b and 184a, 184b of cover 52 move downwardly, into alignment with the channel members 218, and the tray 52 falls into cavity 220 where it is supported by lower compartment surface 30. Thus, the wire rack 194 assists in the placement of the tray 50 within its respective cavity. Further, the interaction of the cover 52 with the wire rack 194 provides a tactile indication that the tray 50 has been placed within the cavity 220.

Once tray 50 has been inserted into the compartment 24 and the cover 152 rests on the wire rack 194, the front lip 200 and the rear lip 202 of the cover 152 engage the tray opening 62 of tray 50, thereby providing a further seal. Thus, the contents of the tray are further protected against drying out.

Figure 11:
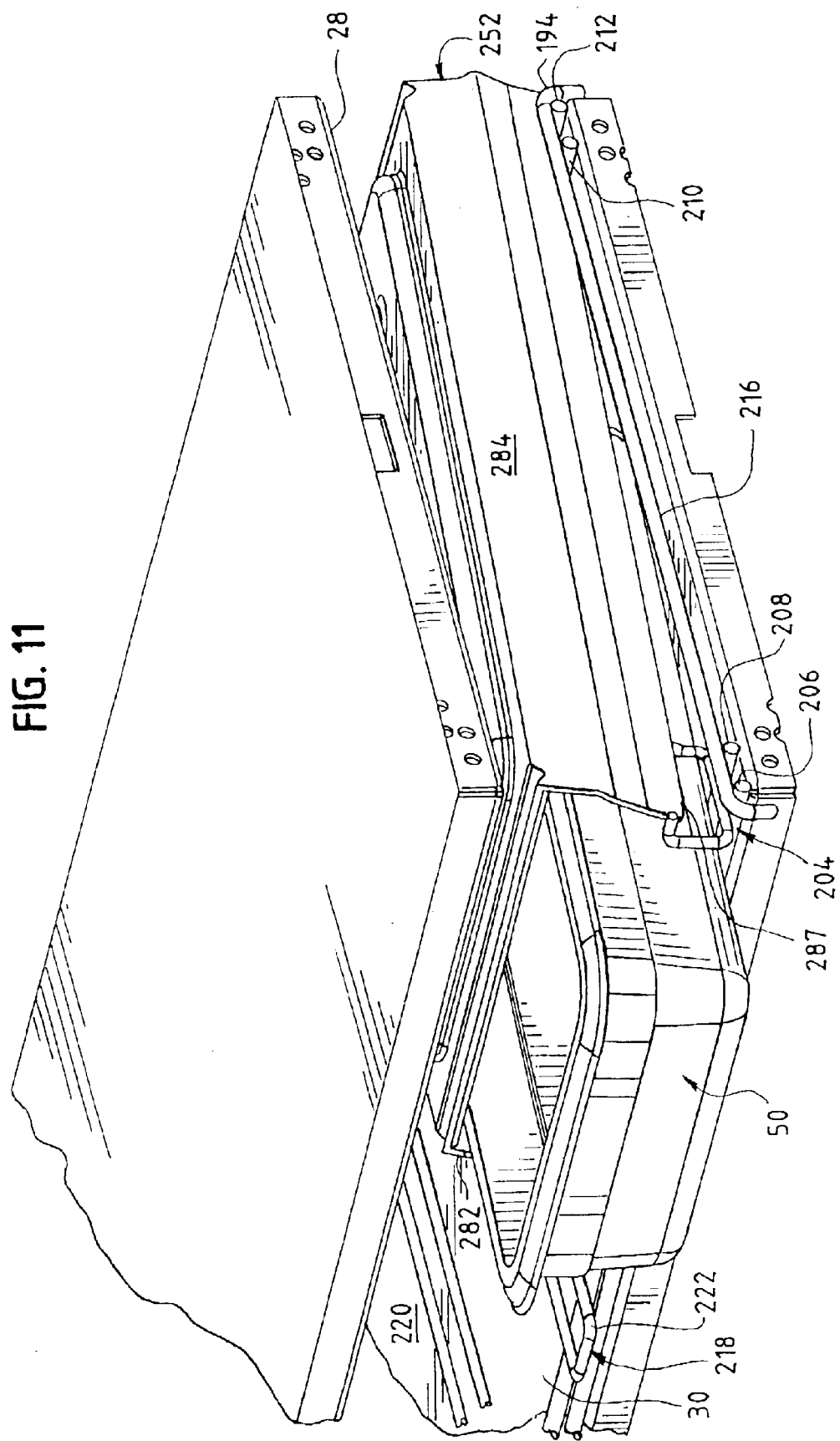
FIG. 11 is a perspective view of a tray being inserted into a compartment of the food warming cabinet of FIG. 1, with a freestanding cover therein, in accordance with another alternate embodiment of the present invention.

Although the embodiment of FIGS. 9–10 has been described in use with tray 152, tray 252 could alternately be used in its place. Tray 252 is similar to tray 152, with the difference being that it has solid sidewalls 282, 284. Thus, rather than the support legs 182a, 182b, 184a, and 184b being placed within channel members 218, the supporting edges 287 of cover 252 are accommodated within the channel members 218. Such an embodiment is depicted in FIG. 11.

While certain features and embodiments of the present invention have been described in detail herein, it is to be understood that the invention encompasses all modifications and enhancements within the scope and spirit of the following claims.

What is claimed is:

1. A method for maintaining previously cooked food portions in a ready to use condition in a food warming apparatus comprising a cabinet having a heated compartment which has an upper compartment surface and a lower compartment surface, said method comprising the steps of:
   providing a wire rack in said heated compartment, said wire rack including a plurality of channel members;
   providing a cover, said cover having a flange section and a support section extending downwardly from said flange section, said support section having a plurality of support legs;
   placing said previously cooked food portions in a tray, said tray having a tray lip defining a tray opening;
   inserting said cover into said heated compartment and placing said support legs of said cover into said channel members of said wire rack to define a receiving space, at least a portion of said flange section being positioned above said receiving space, said cover being retained in said heated compartment by said wire rack; and
   inserting said tray into said receiving space.

2. The method of claim 1, further comprising the step of:
   positioning said tray in said receiving space such that said flange section blocks said tray opening to restrict evaporation of liquid from said previously cooked food portions.

3. The method of claim 2, wherein said flange section has a flange surface, and wherein said step of positioning said tray in said receiving space includes the step of positioning said tray lip to be substantially flush with said flange surface.

4. The method of claim 1, wherein said cover defines a front opening providing access to said receiving space, and wherein said step of inserting said tray into said receiving space includes the step of inserting said tray into said receiving space through said front opening.

5. The method of claim 1, wherein said cover defines a rear opening providing access to said receiving space, and wherein said step of inserting said tray into said receiving space includes the step of inserting said tray into said receiving space through said rear opening.

6. The method of claim 4, further comprising the step of removing said tray from said receiving space through said front opening.

7. The method of claim 5, further comprising the step of removing said tray from said receiving space through said rear opening.

8. The method of claim 1, wherein the wire rack includes a rectangular frame and the plurality of channel members extend transversely from one end of the frame to the opposite end of the frame.

9. The method of claim 8, wherein the channel members define cavities within the wire rack for accommodating trays, and wherein the step of inserting the tray into the receiving space includes placing the tray into a cavity defined by the channel members.

10. The method of claim 8, wherein the rectangular frame of the wire rack includes at least one front frame member, and wherein the step of inserting the tray into the receiving space includes sliding the tray over the front frame member.

11. The method of claim 9, wherein the step of inserting the tray into the receiving space includes providing a tactile indication that the tray has been placed within the cavity.

12. The method of claim 11, wherein the step of providing a tactile indication includes sliding the tray over the wire rack and moving the tray downwardly into the cavity.

13. The method of claim 10, wherein the cover includes a front lip and a rear lip, and further comprising engaging the front lip and the rear lip of the cover with the tray opening, thereby providing a seal to restrict the evaporation of liquid from said previously cooked food portions.

14. The method of claim 1, further comprising the step of inserting said wire rack into said heated compartment.

* * * * *